(12) United States Patent
Bagni et al.

(10) Patent No.: US 7,349,474 B2
(45) Date of Patent: Mar. 25, 2008

(54) METHOD AND APPARATUS FOR VARIABLE BIT-RATE CONTROL IN VIDEO ENCODING SYSTEMS AND COMPUTER PROGRAM PRODUCT THEREFOR

(75) Inventors: Daniele Bagni, Olgiate Molgora (IT); Flavio Benussi, Genoa (IT); Bruno Biffi, Codogno (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 839 days.

(21) Appl. No.: 10/459,104

(22) Filed: Jun. 10, 2003

(65) Prior Publication Data

US 2004/0037357 A1   Feb. 26, 2004

(30) Foreign Application Priority Data

Jun. 11, 2002   (EP)   ................. 02012891

(51) Int. Cl.
 *H04N 7/12*   (2006.01)
(52) U.S. Cl. ................................. 375/240.15
(58) Field of Classification Search ............ 348/405.1, 348/419.1, 409.1, 420, 411, 390, 405; 375/240, 375/240.05, 240.03, 240.06, 240.15, 240.12, 375/240.24, 240.02, 240.17; 382/251, 236; 386/111
See application file for complete search history.

(56) References Cited

U.S. PATENT DOCUMENTS 6,215,820 B1 * 4/2001 Bagni et al. ................. 375/240
6,600,783 B1 * 7/2003 Morita et al. .......... 375/240.03
6,654,417 B1 * 11/2003 Hui ........................ 375/240.03
6,982,762 B1 * 1/2006 Hui .......................... 348/405.1

FOREIGN PATENT DOCUMENTS

EP   0 804 035 A2   10/1997
EP   0 825 725 A1   2/1998
WO   WO 99/63760   12/1999

OTHER PUBLICATIONS

Mohsenian, N. et al., "Single-Pass Constant- and Variable-Bit-Rate MPEG-2 Video Compression," *IBM Journal of Research and Development* 43(4):489-509, Jul. 1999.

* cited by examiner

*Primary Examiner*—Tung Vo
*Assistant Examiner*—Behrooz Senfi
(74) *Attorney, Agent, or Firm*—Lisa K. Jorgenson; Dennis M. de Guzman; Seed IP Law Group PLLC

(57) ABSTRACT

A method for controlling the bit-rate of a bitstream of encoded video signals at a variable bitrate, the bitstream being generated by compressing a video sequence of moving pictures, wherein each picture comprises a plurality of macroblocks of pixels compressed by any of transform coding, temporal prediction, bi-dimensional motion compensated interpolation or combinations thereof, to produce any of I and/or P and/or B frames, the method involving quantization of said macroblocks effected as a function of a quantization parameter. The method includes defining a target bit-rate as well as maximum positive and negative error values between the target bit-rate and an average value of the current bit-rate of the bitstream, controlling the current bit-rate in order to constrain it between said maximum positive and negative error values, and defining an allowed range of variation for updating at least one reference parameter representative of the average value of the quantization parameter over each picture, wherein said allowed range is determined as a function of the target bit-rate and the maximum positive and negative error values.

55 Claims, 6 Drawing Sheets

METHOD AND APPARATUS FOR VARIABLE BIT-RATE CONTROL IN VIDEO ENCODING SYSTEMS AND COMPUTER PROGRAM PRODUCT THEREFOR

BACKGROUND OF THE INVENTION

1. Field of the Invention

The present disclosure relates to encoding of video signals.

A number of video coding systems such as MPEG-2 (see, e.g., (MPEG-2) ISO/IEC 13818-2, Draft International Standard, 1995(E)), H.263 (see, e.g., DRAFT ITU-T Recommendation H.263, 1995), MPEG-4 (see, e.g., (MPEG-4) ISO/IEC 14496-2, Final Draft of International Standard, December 1998), H.26L (see, e.g., ITU-T VCEG Draft H.26L—Test Model Long-term number 8 (TML-8)) are based on a video compression procedure that exploits the high degree of spatial and temporal correlation in natural video sequences. In order to do this, video encoders decompose video sequences in Groups Of Pictures (briefly GOP) by differentiating the features of every picture, within the GOP, in two different classes: Intra and Inter coded images (or frames). Intra frames can be compressed without extra information, whereas Inter frames need either Inter or Intra frame to start their compression.

By way of example, in FIG. 1 a basic video encoding scheme is shown wherein a hybrid DPCM/DCT encoding loop removes temporal redundancy using inter-frame motion compensation.

In the diagram of FIG. 1, an input data stream IS of digital signals representing a video sequence is subjected to frame reordering FR and motion estimation ME. The residual error images are further processed by discrete cosine transform DCT, which reduces spatial redundancy by de-correlating the pixels within a block and concentrating the energy of the block itself into a few low-order coefficients. Higher compression ratios are achieved through scalar quantization Q: for each macro-block the psycho-visual quantization matrix is multiplied by a scalar parameter, named quantization factor or briefly mquant. Finally, variable length coding VLC produces a bit-stream with good compression efficiency. This is fed via a MUX module to an output buffer OB for the compressed output bitstream OS.

In the block diagram of FIG. 1, RCA designates a module implementing the rate control algorithm, while I-Q and I-DCT designate the inverse quantization and inverse DCT processing functions to which the quantized data are subjected within the framework of the motion estimation/coding processes. Reference FS designates the associated frame memory.

All of the foregoing corresponds to principles and criteria which are well known in the art and do not require to be described in greater detail herein.

Generally speaking, every video sequence can be organized in five hierarchy layers or levels: group of pictures (GOP), picture, slice (a group of macro-blocks), macro-block (briefly MB) and block level. This last one is the elementary unit over which DCT operates and it comprises 8×8 pixels. A macro-block is comprised of four luminance (Y) blocks, covering a 16×16 area in a picture, and two chrominance (U and V) blocks, covering the same area (in the so-called 4:2:0 YUV format). The motion estimation and compensation stages operate on macro-blocks. There are three types of pictures: I-pictures, that are strictly intra-frame encoded; P-pictures, that are temporally predicted from earlier I or P frames; and finally B-pictures, that are bi-directionally interpolated between two I- or P-frames.

2. Description of the Related Art

Bit-rate control is a central problem in moving picture encoding systems. This aims at ensuring that the number of bits generated may be as close as possible to a target amount that is usually computed at the start of the video sequence encoding process.

Two main different bit-rate control modes are used for encoding any video source, named constant bit-rate (CBR) and variable bit-rate (VBR).

In a CBR mode, output buffer OB of FIG. 1 is required to produce an output stream at a constant rate. Due to the intrinsic structure of any video coding scheme, the final bit-stream is produced at variable bit-rate. Therefore, this has to be transformed into a constant bit-rate by the provision of the output buffer that acts as feedback controller. In this case, the quantization factor is adjusted for each MB by the rate-control mechanism to avoid output buffer overflow/underflow. Hence, a CBR coding mode cannot guarantee a constant video quality for all the scenes.

On the contrary, when the encoder operates in a VBR mode, an almost-constant (or smoothly variable) quantization factor is used for each type of frame and the output rate can vary according to the image content, thus generating an invariable quality regardless of the content of the video scenes. Therefore, a VBR coding mode cannot guarantee a constant output bit-rate for all the scenes.

As already noted, in both VBR and CBR methods, the parameter used to effect rate-control is the quantizer factor, or mquant. Tuning this parameter may be directed in two different directions: picture quality or bit saving. Decreasing mquant leads to an increase in image sharpness, while a higher number of bits is used for encoding, and vice versa.

One of the parameters involved in mquant computation is image "complexity". A high complexity indicates a "sharp" picture, whereas a low value of this parameter indicates a quite "uniform" picture. Assuming that the human eye has a low perception for details, the rate controller usually adopts lower target-bit values in the areas that have a high complexity.

Generally speaking, rate control is relevant for encoding applications where there are any of:

i) a maximum permitted rate of the transmission channel, ii) a fixed memory capacity to store the bit-stream in a medium like a CD-ROM, a digital-video-disk (DVD), a Hard-Disk on a digital video cassette, or iii) editing capabilities that need regularly spaced GOPs.

The encoding systems are supposed to be "single-pass", that is, the encoding process is done once per picture. "Multi-pass" systems compress several times one or more GOPs and then select the best compression strategy according to the results generated by previous encoding.

Whatever rate control method applied in the encoding system, either CBR or VBR, the encoding system requires that entering and removing coded data will not cause the video buffer verifier (VBV) to overflow or underflow. The VBV is a virtual buffer (not shown in FIG. 1, where only the output buffer is illustrated) maintained in the encoder scheme: its fullness is updated and monitored to simulate the entering and removing of coded data to and from the physical buffer of the video decoder scheme.

An important parameter is the so-called vbv_delay, that is the time interval from the arrival of start code of the current frame to its decode time (in MPEG-2 it is expressed in number of periods of a 90 KHz clock).

If the vbv_delay value is 0xFFFF the MPEG-2 video encoding process is supposed to be a "true VBR". Conversely, if its value is different from 0xFFFF, the video encoding process is either CBR or VBR. In the "true VBR" case, the physical decoder buffer (or encoder VBV) receives data at the maximum rate until it becomes full, then the flow of data is stopped and no further data is lost. When the decoder extracts the bits related to one picture from the buffer, the flow of data always re-starts at the maximum rate (see Annex C.3.2 with the MPEG-2 recommendation cited in the foregoing). Other compression standards have parameters similar to vbv_delay in MPEG-2 to synchronize the decoding time.

U.S. Pat. No. 5,650,860 discloses in greater detail the management of VBV within the frameworks of MPEG-2 compression, however VBV management is not an object of this invention.

The MPEG-2 Test Model 5, briefly TM5 (see, for instance, ISO-IEC/JTC1/SC29/WG11, Test Model, Draft, April 1993 and S. Eckart, C. Fogg, MPEG-2 Encoder/Decoder, Version 1.2, July 1996. Copyright (c) 1996, MPEG Software Simulation Group. http://www.mpeg.org/MSSG/; ftp://ftp.mpeg.org/pub/mpeg/mssg/.), is the reference Video encoding system for MPEG-2 compression. The rate is a CBR and it is useful to set the common language for any CBR and VBR rate control methods.

Other documents of interest in this area are EP-A-1 005 233 (which corresponds to U.S. Pat. No. 6,215,820) and U.S. Pat. No. 5,801,779, U.S. Pat. No. 5,757,434, U.S. Pat. No. 5,986,712, U.S. Pat. No. 5,691,770, U.S. Pat. No. 5,835,149, U.S. Pat. No. 5,686,964, U.S. Pat. No. 5,949,490, U.S. Pat. No. 5,731,835.

Also of interest is WO-A-99/19664, that describes a CBR method that claims VBR image quality, or vice-versa, a VBR method that achieves bit-rate control accuracy like a CBR method.

Other VBR methods are disclosed, e.g., in N. Mohsenian, R. Rajagopalan, C. A. Gonzales, "Single-pass contant- and variable-bit-rate MPEG-2 video compression", IBM J. RES. DEVELOP. vol. 43 no. 4, July 1999, Copyright 1999 by IBM Corporation, WO-A-99/38333, U.S. Pat. No. 5,650,860, and U.S. Pat. No. 6,192,075.

TM5 is a reference model proposed by the MPEG-2 Expert Group (see, e.g., ISO-IEC/JTC 1/SC29/WG 11, Test Model Long-term number 8 (TML-8) and the work by S. Eckart et al. already cited in the foregoing. FIG. 2 of the drawing annexed herewith describes the scheme of this CBR control model.

Generally speaking, the parameters of the encoding process should be set to get two bit-rate control objectives:

1) an output bit-rate that is constant and equal to a predefined one (the target bit-rate);

2) a local picture quality as constant as possible throughout the picture sequence.

Unfortunately, these objectives are conflicting in any CBR method: if too many bits are spent for past pictures, the control system must reduce the number of bits for the next pictures and these will have then a lower quality. A key parameter to solve this problem is mquant, which controls the trade-off between image quality and bit-rate.

In general terms, in the diagram of FIG. 2, input data ID corresponding to the bitrate/frame rate are fed to a module DBG that provides for the determination of the bits per GOP yielding an output parameter R. This is fed to a global target module GT which operates at the GOP level GL to generate a target value T as a function of initial parameters IP and a signal BF indicative of buffer fullness.

Target value T is processed at the picture level PL by feeding it, together with a current value for the effective bits EB (derived from the output bit-rate OBR), to a module BFU providing for the update of buffer fullness.

The output signal from module BFU is fed to a local control module LC which controls, at the macroblock level MBL, the generation of the parameter used in adaptive quantization (AQ) to generate mquant.

Concerning TM5, its CBR algorithm is organized in three steps:

i) target bit allocation. In this phase target bits $T_i$ for the current picture i (with i=I, P or B) are decided. Allocation is effected at the start of picture coding with respect to complexity measures derived from past images of the same type;

ii) local control. From the state of "virtual buffer" $d_i$ a reference quantization parameter, $q_r[n]$, is computed for each macro-block n, before MB quantization; and iii) adaptive quantization. The mquant value is decided to correspond to the effective quantization parameter to be used for current macro-block, knowing $q_i[n]$ from the local control step and MB complexity (also named "activity").

Concerning the target bit allocation or global control phase it is important to consider image sharpness, expressed in terms of complexity X: a detailed picture requires more bits to achieve a certain quality than a less complex one. The global complexity measure for picture i (with i=I, P or B type) can be computed as:

$$X_i = S_i \cdot Q_i \quad (C1)$$

where $S_i$ is the effective number of bits that are used to encode an image of type i (with i=I, P or B) and $Q_i$ is the average mquant over the whole picture.

TM5 assumes that the complexity for pictures of the same type is constant over the sequence; hence, the bits needed for pictures of the same type are equal. The control system tries to obtain the same quality (sharpness) for each picture.

QI, QP, QB are parameters that can give an objective measure for spatial quality at a global level.

So, a constant ratio between these parameters is imposed:

$$K_{IP} = Q_P/Q_I$$

$$K_{PB} = Q_B/Q_P \quad (C2)$$

The TM5 CBR method uses $K_{IP}=1$ and $K_{PB}=1.4$.

Considering the current GOP, if $N_I$, $N_P$ and $N_B$ are the number of pictures not yet encoded, R the number of remaining bits to be yet allocated and $T_I$, $T_P$ and $T_B$ the estimated amount (or target) of bits that is needed for each picture of the GOP itself. Consequently:

$$R = N_I \cdot T_I + N_P \cdot T_P + N_B \cdot T_B \quad (C3)$$

At the beginning of each n-th GOP, R assumes the following value $R_{(n)}$:

$$R_{(n)} = R_{(n-1)} + \frac{(N_I + N_P + N_B) \cdot bitrate}{frame\_rate} \quad (C4)$$

that is the number of bits allowed for the current GOP number n, taking into account possible (positive or negative) remaining bits from previous (n−1) GOPs.

The target bits for each type of image are computed as:

$$T_I = \frac{R}{1 + \frac{N_P \cdot X_P}{X_I \cdot K_{IP}} + \frac{N_B \cdot X_B}{X_I \cdot K_{PB} \cdot K_{IP}}} \quad (C5)$$

$$T_P = \frac{R}{N_P + \frac{N_B \cdot X_B}{X_P \cdot K_{PB}}}$$

$$T_B = \frac{R}{N_B + \frac{N_P \cdot K_{PB} \cdot X_P}{X_B}}$$

where final the Ti's are chosen to be max(Ti, Tmin) and:

$$T\text{min} = \text{bitrate}/(8 \text{ frame\_rate}) \quad (C6)$$

At the end of the current picture encoding step, R is modified by subtracting the actual number of bits $S_i$ generated for image i:

$$R = R - S_i \quad (C7)$$

A local control phase ensures that the bits spent after having encoded a picture will be the same number as decided by the Global Control. For this purpose three "virtual buffers" are used, one for each type of picture.

Before encoding MB n, buffer fullness is calculated according to the relationship:

$$d_i[n] = d_i[0] + B_{(n-1)} - (n-1)(T_i/\text{numMB}) \quad (C8)$$

with i=I, P or B, while $B_{(n-1)}$ represents the number of bits generated by the encoding process until macro-block n. At the end of each picture, the virtual buffer fullness is updated:

$$d_i = d_i + S_i - T_i \quad (C9)$$

where $d_i$ represents the error between the number of bits $T_i$ decided by the Global Control and effective encoding bits $S_i$.

In Equation C8, bits spent until reaching the actual MB are related to a notional uniform distribution of target bits over all macro-blocks of the picture (numMB).

The reference quantization parameter $q_i[n]$ is calculated considering the virtual buffer fullness, as in the following:

$$q_i[n] = \text{round}(31 \, d_i[n]/r) \quad (C10)$$

where the reaction parameter r is defined as:

$$r = 2 \text{ bitrate/frame\_rate} \quad (C11)$$

This is a proportional (local) controller that uses a non-realistic uniform model for the distribution of bits over the picture.

Additional rate-control-accuracy can be achieved by using Proportional-Integrative (PI) controllers, as reported in G. Keesman, I. Shah, R. Klein-Gunnewiek, "Bit-rate control for MPEG encoders", Signal Processing: Image Communication, vol. 6, pp. 545-560, 1995.

In normal-life video pictures, there are highly sharp areas and quite uniform ones. Therefore, it is preferable to use a variable quantizer that follows changes in the local variance as a possible measure of the image local activity.

The activity of macro-block n, named act[n], will modulate the reference quantization parameter $q_i[n]$ to produce the final quantization step mquant[n], as shown in Equation C14 in the following.

Spatial activity act[n] is computed as the minimum of the variances ($\text{var}_u$) of the four blocks in a macro-block either in field or frame mode (so that we get eight variance values):

$$\text{act}[n] = 1 + \min_{u=1 \ldots 8} (\text{var}_u) \quad (C12)$$

Then a normalized activity Nact[n] is computed as:

$$\text{Nact}[n] = (2 \text{ act}[n] + \text{AvgAct})/(\text{act}[n] + 2 \text{ AvgAct}) \quad (C13)$$

where AvgAct is the average value of act[n] over the last encoded picture.

It would be natural to think to encode more accurately the most detailed zones (high local activity) giving them more bits, while neglecting the uniform areas that carry less information. However, quantization noise is much more visible in uniform (low activity) areas, hence it is necessary to less coarsely quantize these ones. The expression used to produce mquant is:

$$\text{mquant}[n] = q_i[n] \cdot \left( \frac{2 \cdot \text{act}[n] + \text{AvgAct}}{\text{act}[n] + 2 \cdot \text{AvgAct}} \right) \quad (C14)$$

After the three steps of TM5 CBR control, mquant is weighted by visibility matrices (that can change at picture level) before actually quantizing each coefficient (by stage Q of FIG. 1). A visibility matrix sets the relative coarseness of quantization allowing a larger quantization error at higher frequencies where human eye is less sensitive. The TM5 matrix to quantize DCT coefficients of Intra Macro-Blocks is reported in the following Table 1. The DC coefficient is uniformly quantized with weight 8,4,2,1, depending on the desired accuracy.

TABLE 1

| 8  | 16 | 19 | 22 | 26 | 27 | 29 | 34 |
|----|----|----|----|----|----|----|----|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

The AC coefficients AC(i, j) are weighted according to the following relationship:

$$c(i; j) = (32 \cdot AC(i, j) + w_I(i, j)/2)/w_I(i, j) \quad (C15)$$

where $w_I$ (i, j) is the component (i, j) of the matrix reported in Table 1. The quantized coefficient QAC(i, j) depends on the mquant (quantizer scale) parameter:

$$AC(i, j) = (ac(i, j) + (3 \cdot \text{mquant} + 2)/4)/(2 \cdot \text{mquant}) \quad (C16)$$

The computed value QAC(i, j) is then in any case clipped in the range [-2048; 2047].

The TM5 CBR control method is implemented with a simple proportional controller based on virtual buffer state as given by Equations C8, C9 and C10.

A problem with this algorithm is the ideal uniform distribution of target bits over macro-blocks. If a picture is considered divided in two parts, the upper part being uniform (lower activity) and the lower part being full of details, TM5 would try to give the upper area half of bits available, even if there are few DCT coefficients. As a consequence, bits left for the bottom part of the picture would not be enough, so TM5 would use a coarse quantization with a quality deterioration of that image part, to maintain constant the output bit-rate.

Another drawback of the TM5 algorithm is a poor behavior in case of scene changes. In fact, during the Target Bit Allocation step, the global complexity is obtained from previously encoded pictures of the same type. This could be a problem for I-frames because the last I-picture may be more than ten images earlier (our GOP is composed of a number of frames at least greater than 12). To improve performance in these situations it is necessary to use a pre-analysis that gives more recent information on the global complexity.

CBR control methods based on pre-analysis can produce an output bit-rate very close to the desired one. They use information from a pre-analysis of the current picture, Where such pre-analysis is a complete encoding of the image with a constant quantizer, as reported in the work by Keesmann et al. already cited in the foregoing. CBR controls with pre-analysis employ a P-I controller in the local control phase.

In the case of slice pre-analysis, some information deriving from past pre-analysis or encoding is necessary to compensate the limited amount of knowledge achieved by pre-encoding only the current slice. Pre-analysis is done over only one slice to reduce:

i) the memory capacity to store pre-encoding information that will be used during the real encoding process (a smaller capacity means less silicon area and thus a lower cost);

ii) the processing delay, because only one slice is pre-encoded (pre-analyzed) at a time.

The solution disclosed in WO-A-99/49664 tries to solve the key problems faced by any CBR controller, namely:

i) non-uniform distortion within a sequence (and even within a picture) gives rise to an output with non-uniform visual quality;

ii) bit allocation methods are inefficient, especially for sequence containing scenes of varying complexity; and iii) poor performance at scene changes.

The method of WO-A-99/49664 was designed to:

i) keep the reference quantization parameter, $q_r[n]$ (I/P/B frame individually) uniform within a sub-sequence of pictures (named "segment") with similar complexity in order to achieve uniform output quality (that is, $q_r[n]=Qp_i=$constant);

ii) dynamically change the bit-rate of the encoder, according to the complexity of the picture being coded, with information fed back via a closed control loop;

iii) improve encoder performance at scene changes;

iv) efficiently allocate bits according to picture type and complexity; and v) strike a balance between adaptation rate of the encoder to changes in picture complexity and gradual degradation capability.

The VBR method reported in WO-A-99/38333 is based either on MSE or PSNR or SNR computation to update the target bit-rate. The method uses the same Target Bit Allocation phase of TM5 CBR.

The CBRNBR methods reported in N. Mohsenian, R. Rajagopalan, C. A. Gonzales, "Single-pass contant- and variable-bit-rate MPEG-2 video compression", IBM J. RES. DEVELOP. vol. 43 no. 4, July 1999, Copyright 1999 by IBM Corporation and U.S. Pat. No. 5,650,860 use relationship between bit-rate and $Q_i$. Such curve, named "rate-distortion" in W. Ding, B. Liu, "Rate Control of MPEG video coding and recording by Rate-Quantization modeling", IEEE Transactions on Circuits and Systems for Video Technology, vol. 6, no.1, February 1996, can be experimentally modeled in several ways, either linear or non-linear, depending on the approximations applied and related computational complexity required. Also, the methods of WO-A-99/38333 and WO-A-99/49664 employ rate-distortion curves and therefore are exposed to the same problems.

In fact, to be very precise, U.S. Pat. No. 5,650,860 uses a slightly misleading terminology, by designating the "rate-distortion" as "bit budget" within a context that has nothing to share with the. proper meaning of this latter term.

The VBR method reported in U.S. Pat. No. 5,650,860 is a non-real time multi-pass encoder: the same GOP is encoded several times with different strategies to gather information about the way bits can be used in the final effective encoding; basically this represents a very sophisticated and expensive pre-analysis, to be used only on professional high-end equipments. Finally, U.S. Pat. No. 5,650,860 discloses CBR and VBR methods that are heavily integrated with VBV management and are consequently depending thereon.

Both the methods of the work of Mohsenian et al. and WO-A-99/38333 are very complex: the first due to its PSNR computation, the second due to the minimization of a Lagrangian cost function (through Lagrange multipliers method).

The VBR method reported in U.S. Pat. No. 6,192,075 uses a relationship for "excessive bit usage". This relationship is not exploited in terms of zones, slopes and related Look-Up-Tables to update $QP_i$. Conversely such a relationship is just used to set the target bits for the current GOP and to clip the effective bit-rate to the target bit-rate. Furthermore, the rate control action uses virtual buffers and proportional-controller similar to TM5 (see Equations C8 and C9 and C10), thus being exposed to all the limitations of TM5.

A number of problems related to CBR and VBR methods have been already indicated in the foregoing.

Even though providing advantages over a CBR method, the solution of WO-A-99/49664 limits dramatically either positive or negative variations of effective bit-rate, in order to achieve an effective bit-rate very close to the target value. This behavior also negatively affects the $QP_i$ variance and average values that are both higher than those for TM5. Higher $QP_i$ variances and average values indicate a worst image quality from an objective point of view.

Furthermore, the experimental "rate-distortion" curves that model the bit-rate vs $QP_i$ relationship in the solutions of WO-A-99/38333, U.S. Pat. No. 5,650,860, WO-A-99/49664 and the work of Mohsenian et al. are strongly dependent on image complexity (or activity). The results obtained by using such curves is sub-optimal and requires accurate modeling that is very expensive in terms of computation.

The best option would certainly be to re-compute these curves several times at any frame, as done in the work of Ding et al., but this is prohibitive in terms of (extremely high) CPU computation, (longer) processing delay, (larger) memory capacity, for products targeting consumer application markets.

Last but not least, both the solutions of WO-A-99/38333 and WO-A-99/49664 are derived from TM5 CBR.

In particular they even use the same TM5 target bit allocation phase. Therefore they inherently suffer—although partially—from the same limitations of TM5.

BRIEF SUMMARY OF THE INVENTION

An embodiment of the invention provides an improved solution for variable bit-rate control in video encoding systems adapted to overcome the drawbacks of the prior art discussed in the foregoing.

According to embodiments of the present invention, a method is provided, as well as a corresponding apparatus and a corresponding computer program product. The computer program product is directly loadable into the internal memory of a digital computer, comprising software code portions for performing an embodiment of the method when said product is run on a computer.

BRIEF DESCRIPTION OF THE SEVERAL VIEWS OF THE DRAWINGS

Embodiments of the invention will now be described, by way of example only, with reference to the annexed drawings, wherein.

DETAILED DESCRIPTION OF THE INVENTION

Figure 1:
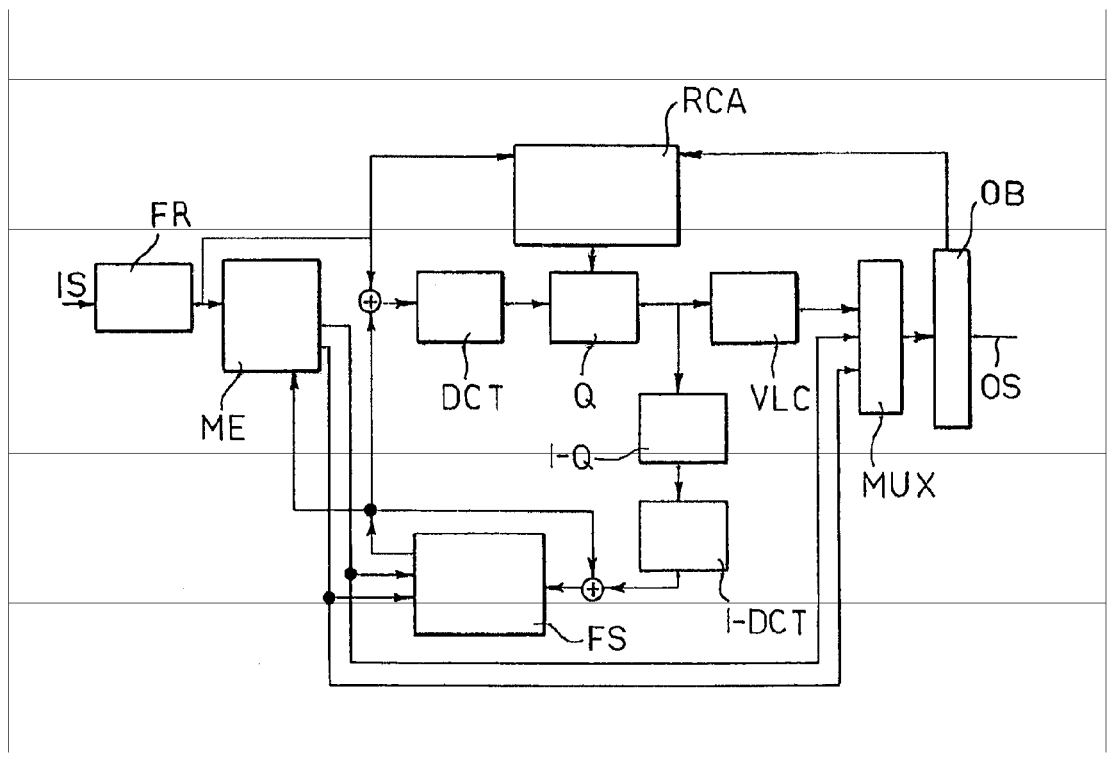
FIGS. 1 and 2, showing a basic video encoding architecture and a block diagram of the MPEG-2 CBR method designated TM5, respectively were already described in the foregoing.
Figure 2:
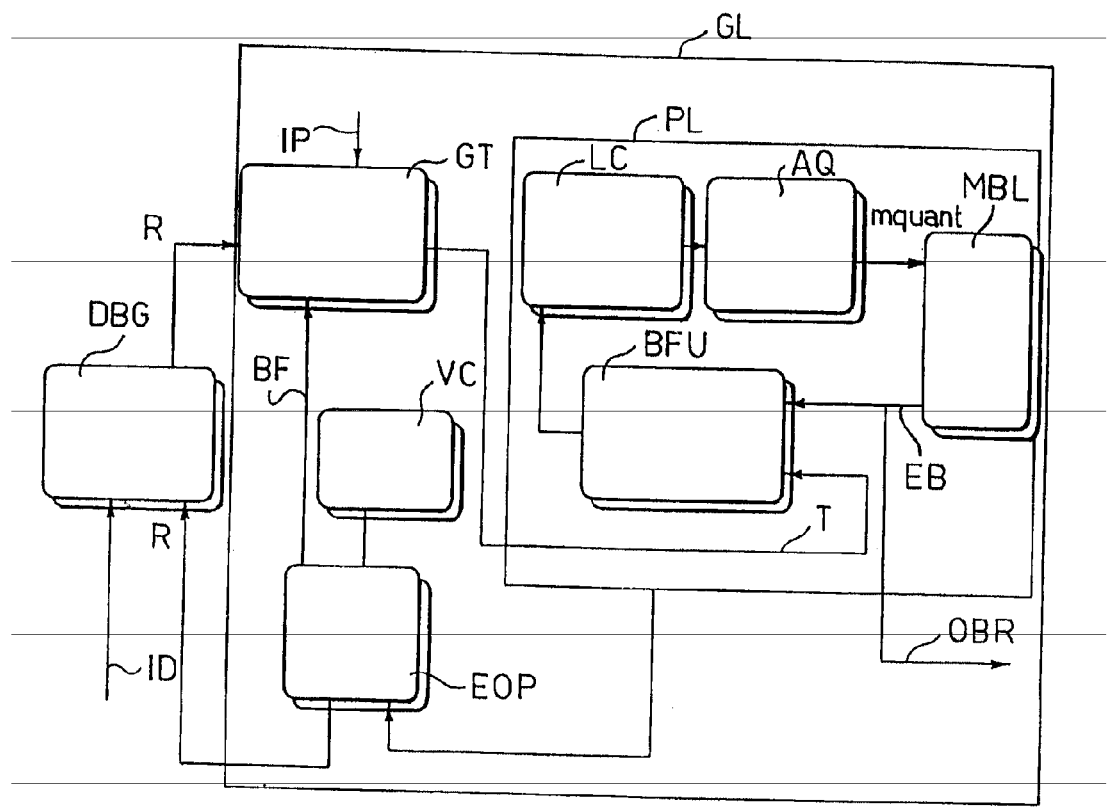

Embodiments of a method and apparatus for variable bit-rate control in video encoding systems and computer program product therefor are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In brief, one embodiment of the invention relates to a variable bit-rate control, adapted for use in any of MPEG-1, MPEG-2, MPEG-4, H.263, H.26L hybrid DPCM/DCT video encoding systems, which achieves high-quality pictures with low-complexity computation in real time. The encoding systems are supposed to be "single-pass", that is, the encoding process is done once per picture, for instance.

In the embodiments, the invention controls at picture level the quantization parameter $QP_i$, which is maintained constant along all the macro-blocks of the same picture to generate constant and uniform image quality within the picture. The method smoothly adapts the $QP_i$ to the changes of image content on a frame-by-frame basis, thus allowing uniform image quality along group of frames of the same sequence. The image quality is of high quality and it is generated without sacrificing the bit-rate control accuracy: the effective bit-rate is accurately maintained within minimum and maximum values to match very closely the target bit-rate, on the average.

The arrangement of an embodiment of the invention seeks improvement in: i) the computation of bit budget curve, ii) the selection of different zones and different slopes of such a curve to decide the best update strategy for every couple zone/slop through a dedicated look-up-table, and iii) post-processing of effective macro-block quantizer (mquant).

Low-complexity derives primarily from all the processing operations being executed at the picture level, that is one of the lowest processing frequencies in any video encoder.

An embodiment of this invention is suitable for implementation as micro-code running on a DSP programmable device for multimedia applications on mobile products (cellular phones and PDAs).

An embodiment of the invention is also adapted for implementation as a micro-code running on a programmable device for set-top-box applications and DVD players/recorders.

More specifically, one embodiment of the invention provides a true VBR method that can be used in any video single-pass real-time encoding system. In particular, when applied to MPEG-2, it requires a vbv_delay value equal to 0xFFFF (which is the typical case of DVD-ROM recorders/players).

The VBR controller produces an effective bit-rate achieved at the end of the encoding process that on the average will be very close to the target bit-rate. The quantization parameter $QP_i$ controlled by the rate control method is very smoothly changed and adapted to images content changes to generate very high quality pictures.

An embodiment of the method is organized in a plurality of stages, and involves the possible use of experimental parameters, adopted to yield the best trade-off between image quality and control accuracy, under very different encoding conditions.

Figure 3:
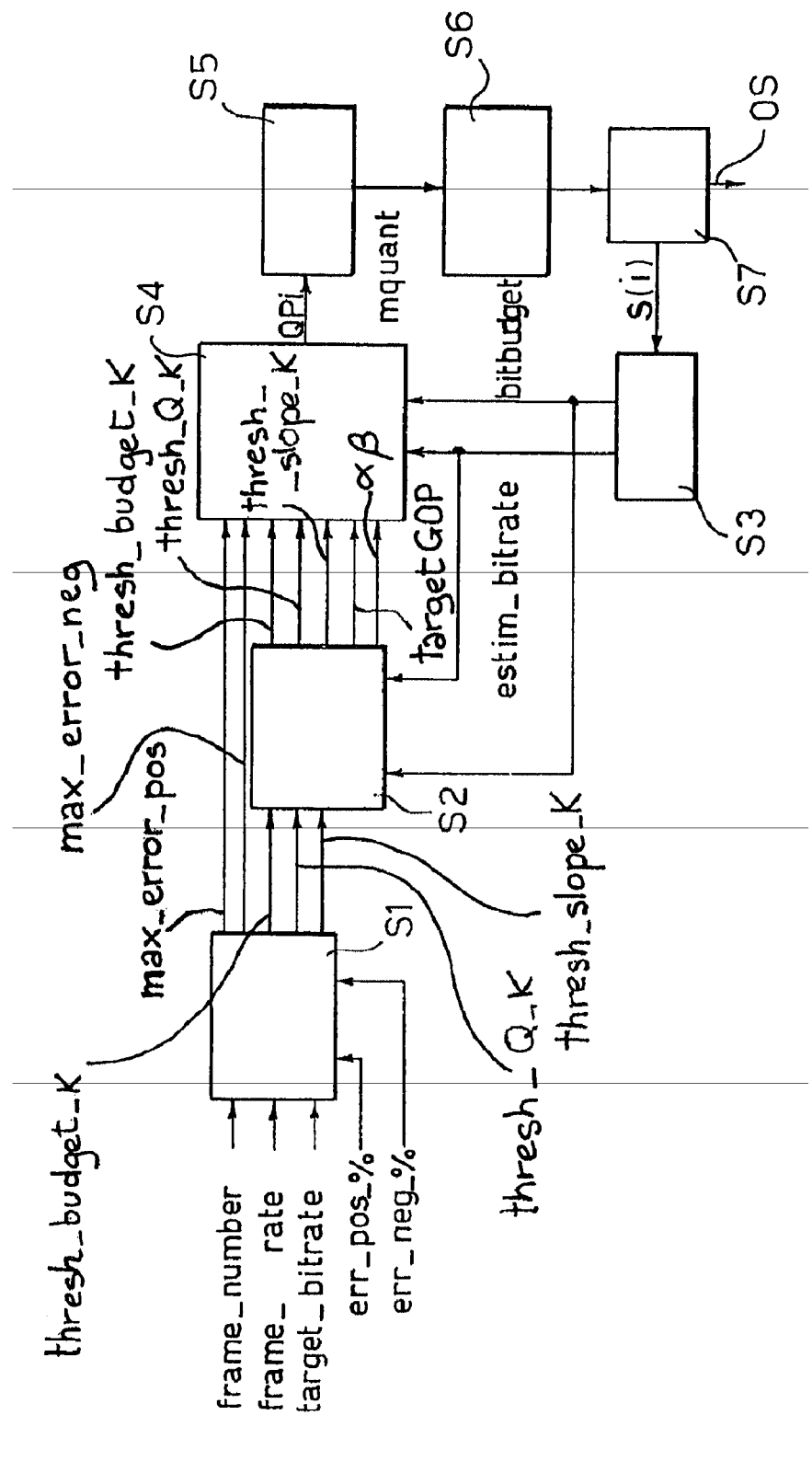
FIG. 3 shows a block diagram of an arrangement implementing the VBR method of an embodiment of the invention.

The diagram of FIG. 3 shows how the output bitstream OS is generated according to an embodiment of the invention as a function of a given set of input with the intermediary of data/parameters with the intermediary of seven processing phases or steps hereinafter designated "stages" S1 to S7.

As those skilled in the art will promptly appreciate, these processing stages are adapted to be implemented both as respective processing modules of a dedicated processor, and as software modules executed within a general purpose processor such as a DSP.

Also, in the rest of this description the following symbols were used:

$X_i$ is a complexity measure of a picture of type i=I, P, B, to indicate the degree of details of the picture. It can be computed either for blocks or MB or Pictures, as used in TM5 terminology;

$S_i$ is the effective number of bits that are spent to encode a picture of type i=I, P, B, as used in TM5 terminology;

$S(k)$ substantially corresponds to $S_i$ above, the index k being used to indicate the last k-th frame during the encoding process, independently in the type of the picture (I, P or B);

mquant is the final MB quantization parameter used by MPEG-2 Quantization process with psycho-visual quantization matrices;

$Q_i$ is the average value of mquant for the whole picture of type i=I, P, B; as used in TM5 terminology;

$q_i[n]$ is the quantization parameter used by the rate control method to quantize a macro-block of index n, in a picture of type i=I, P, B, as used in TM5 terminology. The rate controller can change its value at every macro-block, to maintain constant the output bit-rate. This behavior generates non-uniform visual quality;

$Qp_i$ is a constant value of $q_i[n]$ for all macro-blocks of the same picture of type i=I, P, B;

vbv_delay is a field/record in the video bit-stream which indicates the amount of equivalent 90 KHz clock cycles necessary for the video decoder to decode the incoming picture. It allows encoder and decoder synchronization, otherwise, the decoder could decode more rapidly or slowly the video bitstream, independently on the picture rate;

$N_i$ is the number of pictures not yet encoded, with type i=I, P, B, as used in TM5 terminology;

R is the number of available bits not yet allocated, as used in TM5 terminology;

$R_{(n)}$ is again the same R as above, the index n is used to indicate the n-th GOP during the encoding process, as used in TM5 terminology;

$T_i$ represents the number of bits that are targeted for future pictures to be encoded, with type i=I, P, B, as used in TM5 terminology; and $d_i[n]$ is the dimension of a virtual buffer (different from VBV) used by the proportional (P) local controller of TM5 CBR control, applied to macro-block of index n, in a picture of type i=I, P, B, as used in TM5 terminology.

Stage S1: Sequence Initialization (at the Sequence Level)

Before encoding a video sequence, this stage computes the maximum positive (max_err_pos) and negative (max_err_neg) errors of the target bit-rate (target_bitrate), once the user has set the allowed percentage errors (err_pos and err_neg, both in %) and the target bit-rate:

$$\text{max\_err\_pos} = \frac{\text{target\_bitrate}}{\text{frame\_rate}} \cdot \text{frames\_number} \cdot \frac{\text{err\_pos}(\%)}{100} \quad (A1)$$

$$\text{max\_err\_neg} = \frac{\text{target\_bitrate}}{\text{frame\_rate}} \cdot \text{frames\_number} \cdot \frac{\text{err\_neg}(\%)}{100} \quad (A2)$$

As an example, if the target bit-rate is 5 Mbps and the compressed data is intended to be stored into a medium for 60 minutes, an err_neg=1% means that data are being recorded for 59 minutes and 24 seconds. On the other hand, an err_pos=5% means that data will need to be stored for 63 minutes.

The term frames_number represents the number of frames in the sequence, which depends on the time duration of the video sequence to be encoded. When the user has defined the time duration, the number of frames can be automatically computed, given the frame rate (frame_rate).

This stage computes also the thresholds that will be effectively used by Stage S4, in particular:

four thresholds thresh_slope_k (with k=1, 2,3,4); the thresholds are computed as $$\text{thresh\_slope\_}k = C_k \cdot \text{target\_bitrate for } k=1,2,3,4 \quad (B1)$$

with $C_1$, $C_2$, $C_3$, $C_4$, experimental parameters;

five thresholds thresh_budget_k (with k=5, 6,7,8,9); the thresholds are computed as $$\text{thresh\_budget\_}k = C_k \cdot \text{max\_err\_pos for } k=5,6 \quad (B2)$$

$$\text{thresh\_budget\_}k = C_k \cdot \text{max\_err\_neg for } k=7,8,9 \quad (B3)$$

with $C_5$, $C_6$, $C_7$, $C_8$, $C_9$ experimental parameters;

four thresholds thresh_Q_k (with k=1, 2, 3, 4) determined experimentally.

All the experimental parameters $C_k$ and related thresholds may be maintained constant along the whole sequence. Alternatively, they may be modified in an adaptive manner.

Stage S2: GOP Initialization (at the GOP Level) and Adaptive Thresholds

Before encoding any new GOP, this stage sets the amount of bits to be used (on the average) per GOP, given by:

$$\text{TargetGOP} = (n_I + n_P + n_B) \cdot \frac{\text{target\_bitrate}}{\text{frame\_rate}} \quad (A3)$$

where every GOP is supposed to be composed of $n_I$ I-frames, $n_P$ P-frames and $n_B$ B-frames.

Since the experimental parameters $C_k$, computed by previous stage may be adaptively changed, stage S2 has the possibility to change them at every GOP, depending on a function of estim_bitrate and bit_budget, as defined respectively by Equations A4 and A8.

Stage S3: Local Control (at the Picture Level)

The local control is responsible for $q_i[n]$ computation for every n-th MB, like in TM5. In an embodiment of the invention, the $q_i[n]$ parameter is maintained constant for all the MBs of the same frame to get constant image quality along the sequence; therefore, this stage works at the picture level.

In the following the term $QP_i$ is always used to indicate a constant value of $q_i[n]$, whatever i=I, P, B frame type.

Before encoding the new input picture i, this stage computes the following parameters.

A) The error, on a frame basis, between the target bit-rate and the effective bit-rate used until the previous frame:

$$\text{bit\_budget}(i) = \text{bit\_budget}(i-1) + \frac{\text{target\_bitrate}}{\text{frame\_rate}} - S(i-1) \quad (A4)$$

with $S(i-1)$ the number of bits effectively used to encode previous frame i−1, and target_bitrate/frame_rate representing the target number of bits available for every frame, given by the ratio of target bit-rate (target_bitrate) and the frame rate (frame_rate). Of course, for the first frame of a sequence, the term bit_budget(1−1) is zero.

Note that $$\text{max\_err\_neg} <= \text{bit\_budget} <= \text{max\_err\_pos} \quad (A5)$$

At the end of encoding process, a positive/negative value is obtained, the encoder used less/more bits than the theoretically available ones, that is, the effective bit-rate is lower/greater then the targeted one.

Equation A4 indicates the way the target bits are allocated to the pictures not yet encoded, this is the reason of its name, "bit budget". The amount of target bits is dynamically updated by subtracting the S(i−1) bits that were already spent for previously encoded pictures.

B) Estimate of the amount of bits used by the encoder to encode the current GOP (named ssGOP):

$$\text{ssGOP} = n_I S_I + n_P S_P + n_B S_B \quad (A6)$$

with $S_I$, $S_P$ and $S_B$ the amounts of bits effectively used for the last pictures of type I, P and B, respectively and $n_I$, $n_P$ and $n_B$ the number of I, P and B frames inside a GOP.

In fact, ssGOP represents only an estimate of the effective number of bits used in a GOP, since we consider that $n_I$-frames, $n_P$ P-frames and $n_B$ B-frames will use the same amount of bits within the same GOP. So ssGOP is chosen instead of the average of all the S(i) bits effectively used to encode frame i in order to smooth the eventual oscillations that S(i) could have; furthermore, concerning an implementation, in the second case a number of registers is maintained equal to the number of frames per GOP to compute the real average, while in this solution only three registers are needed, to store the parameters $S_I$, $S_P$ and $S_B$.

An estimate of the instantaneous bit-rate (estim_bitrate), used by the next stage S4 can be computed as:

$$\text{estim\_bitrate} = (ss\text{GOP} \cdot \text{frame\_rate})/(n_I + n_P + n_B) \quad (A8)$$

with ssGOP given by Equation A6.

Stage S4: Basic QP Computation (at the Picture Level)

The four thresholds thresh_Q_k computed by Stage S1 represent four reference values for $Q_{base}$ that define image quality as "low" (thresh_Q_1), "normal" (thresh_Q_2), "medium" (thresh_Q_3), and "high" (thresh_Q_4), independently on the bit-rate. In fact, as also reported in the work of Ding et al. referenced in the introductory portion of the description, the $QP_i$ is a better indicator of spatial image quality than the Peak Signal-to-Noise Ratio (PSNR), therefore we made subjective evaluations at different bit-rates and different images content to assess the above mentioned four images quality degrees.

Figure 5:
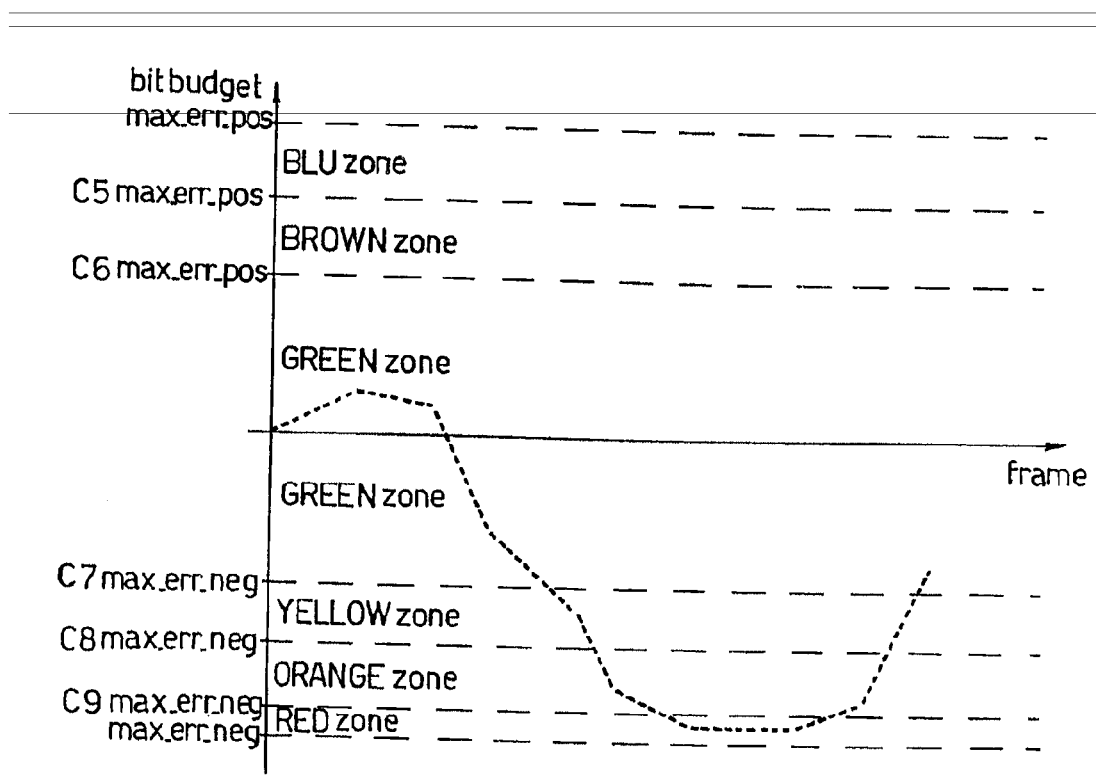
FIG. 5 shows an example of a bit_budget (vertical axis) versus frame number (horizontal axis) curve, wherein also the related six zones are shown.

Generally speaking, stage S4 is organized in four steps:

I. According to the temporal behavior of bit_budget(i) of Equation A4 and on the five thresholds thresh_budget_k (as computed by Equations B2 and B3 of stage S1), stage S4 selects six zones in the bit_budget(i) curve. For simplicity these zones will be referred to as "blue", "brown", "green", "yellow", "orange" and "red". FIG. 5 shows an example of bit_budget(i) curve and its six zones.

Figure 6:
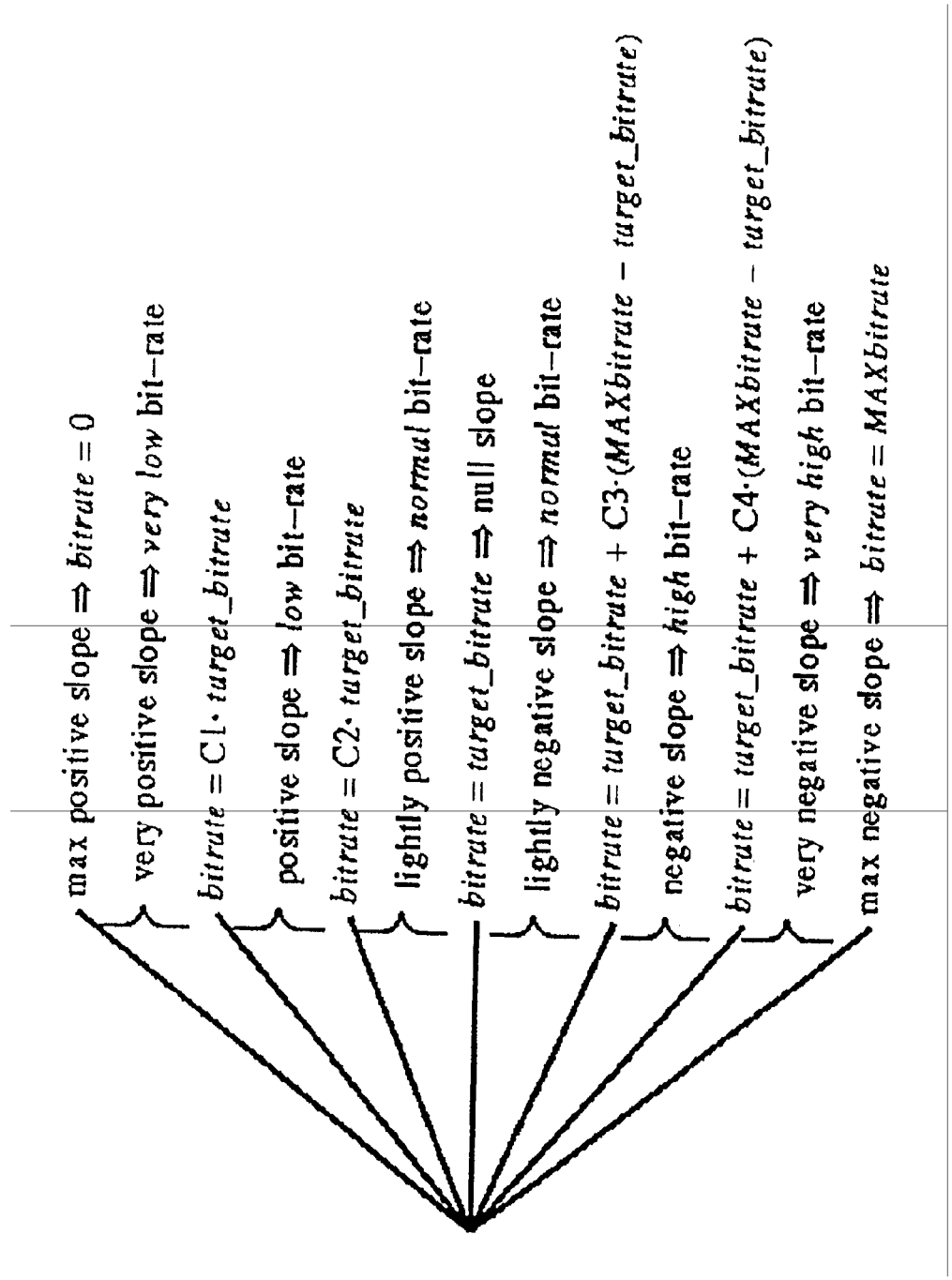
FIG. 6 shows different slopes of bit_budget curve and related bit-rates classification.

II. According to the slopes of bit_budget(i) curve and on the four thresholds thresh_slope_k (as computed by Equation B1 of stage S1), six slopes are selected, representing "very high bit-rate (very negative slopes)", "high bit-rate (negative slopes)", "normal bit-rate (slope almost zero)", "low bit-rate (positive slopes)", "very low bit-rate (very positive slopes)" derivatives, as shown in FIG. 6. Any method to compute the slopes is valid, but in the following Equations A9, A10, A11, A12, A13 which follow a very simple method is shown, based on difference computation, to maintain a low-cost implementation.

III. According to the selected zone in step I, and according to the selected slope in step II, and to the four thresholds thresh_Q_k (as computed by stage S1), the value of $Q_{base}$ in the previous picture is updated of a certain integer quantity ΔQ (with 1 as minimum value). The update is fixed for all the sequence, but an adaptive parameter can be possibly used.

IV. The final $QP_i$ values for i=I, P and B frames are computed. Depending on the various type of pictures:

$$QP_I = Q_{base} \quad (A7)$$

$$QP_P = Q_{base} \cdot a$$

$$QP_B = Q_{base} \cdot b$$

with a and b experimental parameters, that can be maintained either constant or adaptively changed on a frame basis, depending on image complexity. For the first pictures of the first GOP of the sequence, $Q_{base}$ parameter can be fixed according to experimental values.

The six zones of the bit_budget(i) curve of FIG. 5 are computed through the following Equations:

Blue zone if thresh_budget_
    5<=bit_budget<=max_err_pos     (B4)

Brown zone if thresh_budget_
    6<=bit_budget<=thresh_budget_5     (B5)

Green zone if thresh_budget_
    7<=bit_budget<=thresh_budget_6     (B6)

Yellow zone if thresh_budget_
    8<=bit_budget<=thresh_budget_7     (B7)

Orange zone if thresh_budget_
    9<=bit_budget<=thresh_budget_8     (B8)

Red zone if
    max_err_neg<=bit_budget<=thresh_budget_9     (B9)

An embodiment of the method for computing the slopes of the bit_budget(i) curve of FIG. 5 will now be described. The method is based on the experimental fact that the instantaneous bit-rate and the slope of bit_budget(i) have a very close relationship. The six slopes can be derived with the following Equations:

very positive if 0<=estim_bitrate<=thresh_slope_1     (A9)

positive if thresh_slope_
    1<=estim_bitrate<=thresh_slope_2     (A10)

slightly positive if thresh_slope_
    2<=estim_bitrate<=thresh_slope_3     (A11)

slightly negative if thresh_slope_
    3<=estim_bitrate<=thresh_slope_4     (A12)

very negative if thresh_slope_
    4<=estim_bitrate<=MAX_bitrate     (A13)

Note that estim_bitrate=0 of Equation A9 can never occur, since even if the images could not vary at all (still pictures) in the final bit-stream there are always ancillary bits related to several headers (Sequence, GOP, Picture, Slice, Macro-Block and Block).

Note also that MAX_bitrate represents the maximum target bit-rate allowed by the application (for example, 10 Mbps in DVD-ROM disks).

FIG. 6 shows the slopes of bit_budget(i) and the related bit-rate derivatives classification.

The final update method is given by a Look-Up-Table (briefly LUT) as the one shown in Table 2 below, related to one of the zones of FIG. 6. The allowed updates value are mapped differently for any zone, therefore there are six different LUTs that map the updating strategy to the related zone, although in this document we will show only one, for sake of conciseness.

TABLE 2

| Qbase (horizontally) Slope (vertically) | low | normal | medium | high |
|---|---|---|---|---|
| very low bitrate | ΔQ | ΔQ | 0 | 0 |
| low bitrate | ΔQ | 0 | 0 | 0 |
| normal bitrate | 0 | 0 | 0 | 0 |

TABLE 2-continued

| Qbase (horizontally) Slope (vertically) | low | normal | medium | high |
|---|---|---|---|---|
| high bitrate | 0 | 0 | 0 | $-\Delta Q$ |
| very high bitrate | 0 | 0 | $-\Delta Q$ | $-\Delta Q$ |

Specifically, Table 2 above exemplifies a Look-Up-Table that maps the five bit-rate slopes and related $Q_{base}$ updates, depending on the four thresholds of $Q_{base}$ that represent low, normal medium and high picture quality, respectively. There are as many LUTs as zones of bit_budget curve in FIG. 5.

Stage S5: Adaptive Quantization (at the MB Level)

This stage computes exactly the same Adaptive Quantization method as done in CBR TM5 (see Equation C14). The Adaptive Quantization is not object of this invention and any valid method can be used in joint action with this VBR rate control proposal. TM5 Adaptive Quantization is thus used just as an example.

Stage S6: mquant Post-Processing (at Picture Level)

To get the best trade-off between bit-rate control accuracy and uniform image quality along the frames of the sequence, this stage can optionally perform a post-processing of mquant (mquant) values generated by any Adaptive Quantization stage, for every picture:

$$\text{new\_mquant} = \text{mquant} + M \text{ if } (S_i > \text{target\_picture\_size}) \quad (A14)$$

$$\text{new\_mquant} = \text{mquant} - M \text{ if } (S_i < \text{target\_picture\_size})$$

where $S_i$ is the amount of bits effectively used to encode the last frame of type i=I, P, B, and $$\text{target\_picture\_size} = F (Tmin\_i, TrgtPict_i) \quad (A15)$$

F ( ) is a function of two terms:

the second ($TrgtPict_i$) can be any a-priori target for picture of i=I, P, B type, like for example the targets $T_i$ computed by TM5 Equations C5;

the first (Tmin_i with of i=I, P, B) representing the minimum targeted amount of bits to be spent for the picture to be encoded, given by:

$$T\min\_B = \frac{\delta \cdot \frac{BitRate}{FrameRate}}{v \cdot \lambda + N_P \cdot \lambda + N_b} \quad (A16)$$

$$T\min\_P = PicTrgtMIN_B \cdot \lambda$$

$$T\min\_I = PicTrgtMIN_P \cdot v$$

where $\delta$, $\lambda$, $v$ are experimental parameters and $N_P$ and $N_B$ the number of P and B pictures not yet encoded, like in Equation C3.

The two terms of function F( ) from Equation A15 are not necessarily at the same time: those skilled in the art can realize valid methods that use either the two terms or only one of them.

Figure 4:
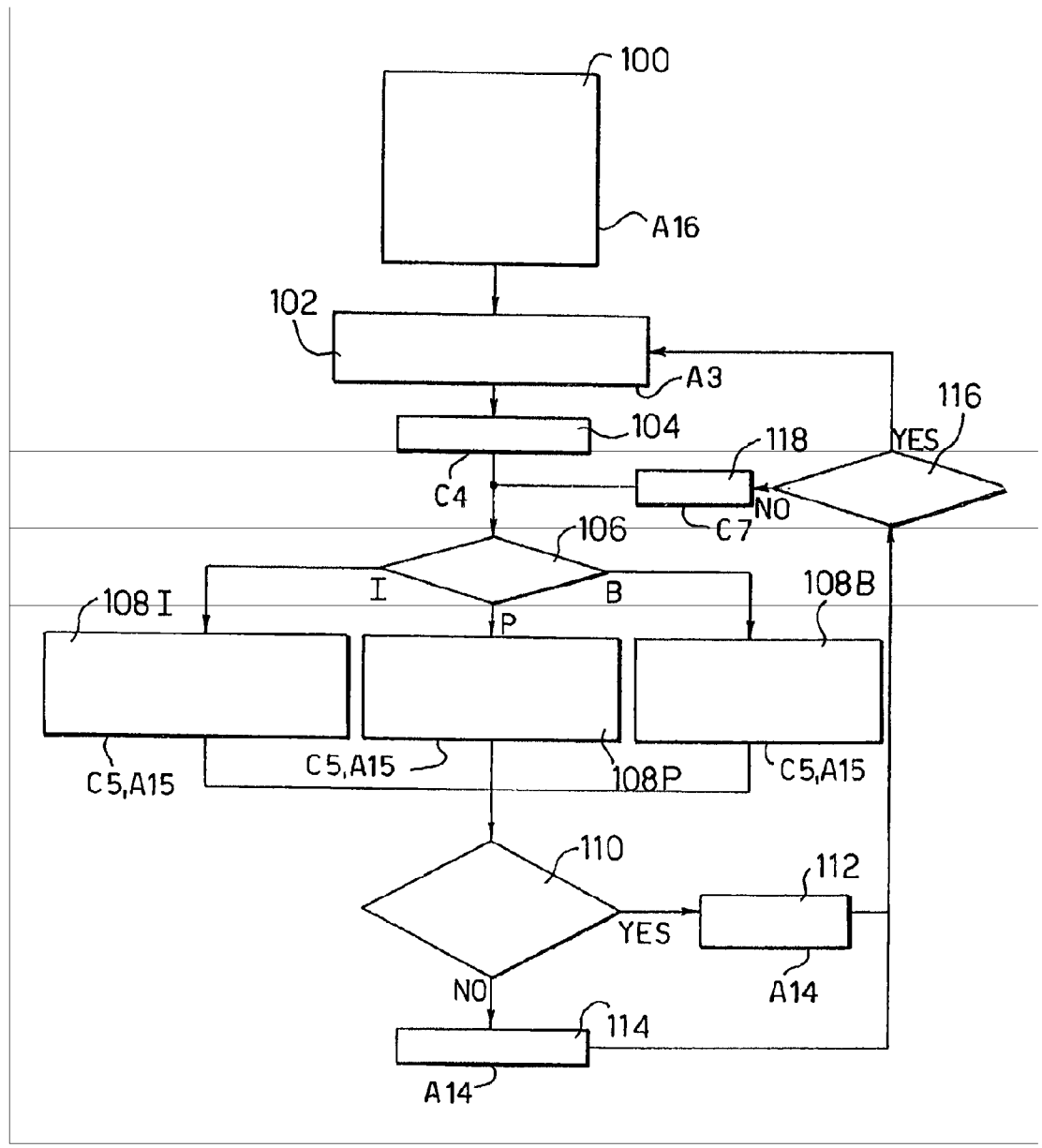
FIG. 4 is a flow chart representing the implementation of stage S6 in FIG. 3.

FIG. 4 shows the flow diagram of this stage: for the sake of clarity, and just as an example, the $TrgtPict_i$ parameters are the one as computed by TM5 Equations C5.

A number of the blocks shown in the flow diagram of FIG. 4 bear, in addition to a reference numeral, also an indication of the formula implemented therein.

So steps 100, 102 and 104 provide for the subsequent implementation of equations A16, A3 and C4, respectively.

Step 106 is a selection step where the kind of picture (I, P or B) is identified to subsequently implement equations C5 and A15 in the form corresponding to the type of picture, namely I (step 108I), P (step 108P) or B (step 108B).

Step 110 is again a selection/conditional step where the parameter $S_i$ is compared with the threshold represented by target_picture size.

If the comparison leads to a positive outcome (YES), equation A14 is implemented in a step 112 by increasing mquant by M.

If the comparison leads to a negative outcome (NO), equation A14 is implemented in a step 114 to decrease mquant by M.

In either case a further comparison is effected in a step 116 to verify the "end of GOP" condition.

In the negative (NO), equation C7 is implemented in a step 118 to return upstream of selection step 106.

If the "end of GOP" condition is verified (YES) in step 116, return is towards step 102.

M represent an integer update value: for example M=1 means very little updates of mquant, while M=10 very large updates. M can be maintained either constant or adaptively changed on either a frame or a GOP basis.

Stage S7: Real Encoding (at the MB Level)

This stage is responsible of the real encoding of the Macro-Block, according to the encoding system, and generates the final output stream.

Performance of the solution in accordance with an embodiment of the invention was tested by building a PAL train of subsequences to get a whole sequence of 974 frames, by concatenating sequences like Renata (99 frames), Brazil (99), Car2 (90), Kiel_lauf (37), Popple (99), Voitur (88), Calendar (99), Edit (97), Flowers (90), Puzzle (80), Soccer (49), tennis (99 frames). Another train sequence, in NTSC standard, composed of Bball (30), Container (68), Fball (262), Stefan (299), Akina (418), Cheer (149), Weather (300), for a total of 1526 frames was also used for test purposes.

The tests performed show the $QP_i$ computed by the VBR of the invention to be very slowly variable in comparison with the one computed by TM5, in both NTSC and PAL sequences. This means that the solution of the invention achieves a significantly image and sequence quality than TM5 and any other method similar thereto.

As indicated, the following invention can be embodied, for example, in the form of computer-implemented processes and apparatus for practicing those processes. The invention can also be embodied, for example, in the form of computer program code stored in tangible media, as floppy diskettes, CD-ROMs and hard disks, wherein, when the computer program code is loaded and executed by a computer, the computer becomes an apparatus practicing the invention. The invention can also be embodied, for example, in the form of a microelectronics architecture implemented on a silicon-based apparatus or a programmable device running micro-code.

It will thus be appreciated that, the principles of the invention remaining the same, the details and embodiments may vary with respect to what has been discussed in the foregoing without departing from the scope of the invention as defined by the claims that follow.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A method for controlling a bit-rate of a bitstream of encoded video signals at a variable bit-rate, the bitstream being generated by compressing a video sequence of moving pictures, wherein each picture has a plurality of macroblocks of pixels compressed by any of transform coding, temporal prediction, bi-dimensional motion-compensated interpolation or combinations thereof to produce any of I and/or P and/or B frames, the method involving quantization of said macroblocks as a function of a quantization parameter, the method comprising:
   defining a target bit-rate as well as maximum positive and negative error values between said target bit-rate and an average value of a current bit-rate of said bitstream;
   controlling said current bit-rate in order to constrain it between said maximum positive and negative error values; and
   defining at least one reference parameter representative of an average value of said quantization parameter over each picture and updating said at least one reference parameter within an allowed range of variation,
   wherein said allowed range is determined as a function of said target bit-rate and said maximum positive and negative error values, wherein said allowed range is determined as a function of at least one of:
   a first set of thresholds determined as a function of said target bit-rate;
   a second set of thresholds defined as a function of said maximum positive and negative error values; and
   a third set of thresholds determined experimentally.

2. The method of claim 1 wherein said maximum positive and negative error values are determined as a percentage of said target bit-rate.

3. The method of claim 1 wherein said maximum positive and negative error values are determined as a function of a number of frames in the sequence or a frame rate of said sequence.

4. The method of claim 1 wherein said thresholds of said first, second and third sets are determined as a function of parameters maintained constant over a whole of said video sequence.

5. The method of claim 1 wherein said thresholds of said first, second and third sets are determined as a function of parameters that are adaptively changed over the sequence.

6. The method of claim 1, further including:
   determining for every frame in said sequence a current error value between said target bit-rate and a current bit-rate used in a previous frame, said current error value being constrained between said maximum positive and negative error values;
   partitioning a range of said current error value in a plurality of zones; and
   determining the thresholds of said second set as a function of said plurality of zones.

7. The method of claim 6 wherein said plurality of zones is determined as a function of respective slopes of a curve representative of said current error value.

8. The method of claim 7 wherein said plurality of respective slopes of said current error value are obtained by way of comparison with said thresholds of said first set.

9. The method of claim 6 wherein said plurality of zones of said current error value are determined as a function of the current bit-rate of said bitstream, said current bit-rate of said bitstream being closely related to a slope of said current error value.

10. The method of claim 7, further including:
    arranging said video sequence of moving pictures in groups of pictures;
    determining for each frame an estimated amount of bits used to encode a current group of pictures and an estimated instantaneous bit-rate of said bitstream; and
    determining for each frame said respective slopes.

11. The method of claim 6 wherein at least one of these are met:
    said zones are in a number of six;
    said thresholds of said second set are in a number of five; and
    said thresholds of said first set are in a number of four.

12. The method of claim 1 further comprising:
    updating said at least one reference parameter using an update which is either a positive, negative or a zero integer value; and
    correspondingly updating said quantization parameter as a function of said at least one reference parameter.

13. The method of claim 12, wherein said quantization parameter is updated based on these relationships:

$$QP_I = Q_{base}$$

$$QP_P = Q_{base} \cdot \alpha$$

$$QP_B = Q_{base} \cdot \beta$$

wherein:
   $Q_{base}$ is said at least one reference parameter;
   $\alpha$ and $\beta$ are experimental parameters; and
   $QP_I$ with I=I, P and B, are final quantization values for I, P and B frames, respectively.

14. The method of claim 13 wherein said experimental parameters are maintained constant.

15. The method of claim 13 wherein said experimental parameters are adaptively modified on a frame basis.

16. The method of claim 12 wherein said positive, negative or zero update values are selected within at least one look-up table as a function of entries defined by said zones.

17. The method of claim 16 wherein said plurality of zones defines entries along one of lines and columns of said look-up table, the entries for another of said lines and columns being represented by different ranges of said at least one reference parameter corresponding to different quality levels of said pictures.

18. The method of claim 1 further comprising post-processing said at least one quantization parameter as a function of at least one of these following entities:
    an amount of bits effectively used to encode a last frame;
    a minimum target amount of bits to be used for coding a picture to be encoded; and
    an a priori target for pictures of an I, P or B type.

19. The method of claim 18, further comprising varying said variable bit-rate exclusively during said post-processing as a function of an updated quantization parameter.

20. The method of claim 10, further comprising adaptively computing thresholds of any of said first, second and third sets of thresholds before encoding said groups of pictures.

21. A system to control a bit-rate of a bitstream of encoded video signals at a variable bit-rate, the bitstream being generated by compression of a video sequence of moving pictures, wherein each picture has a plurality of macroblocks of pixels compressed by any of transform coding, temporal prediction, bi-dimensional motion-compensated interpolation or combinations thereof, to produce any of I and/or P and/or B frames, and involving quantization of said macroblocks as a function of a quantization parameter, the system comprising:
- a first module to define a target bit-rate as well as maximum positive and negative error values between said target bit-rate and an average value of a current bit-rate of said bitstream;
- a second module to control said current bit-rate in order to constrain it between said maximum positive and negative error values;
- a third module to define at least one reference parameter representative of an average value of said quantization parameter over each picture and updating said at least one reference parameter an allowed range of variation, wherein said allowed range is determined as a function of said target bit-rate and said maximum positive and negative error values; and
- at least one module to determine said allowed range as a function of at least one of:
- a first set of thresholds determined as a function of said target bit-rate;
- a second set of thresholds defined as a function of said maximum positive and negative error values; and
- a third set of thresholds determined experimentally.

22. The system of claim 21 wherein said thresholds of said first, second and third sets are determined as a function of parameters maintained constant over a whole of said video sequence.

23. The system of claim 21 wherein said thresholds of said first, second and third sets are determined as a function of parameters that are adaptively changed over the sequence.

24. The system of claim 21, further comprising at least one module to:
- determine for every frame in said sequence a current error value between said target bit-rate and a current bit-rate used in a previous frame, said current error value being constrained between said maximum positive and negative error values; and
- partition a range of said current error value in a plurality of zones; and
- determine the thresholds of said second set as a function of said plurality of zones.

25. The system of claim 24 wherein said plurality of zones are determined as a function of respective slopes of curve representative of said current error value.

26. The system of claim 25 wherein said plurality of respective slopes of said current error value are obtained by way of comparison with thresholds of said first set.

27. The system of claim 24 wherein said plurality of zones of said current error value are determined as a function of the current bit-rate of said bitstream, said current bit-rate of said bitstream being closely related to a slope of said current error value.

28. The system of claim 25, further including at least one module to:
- arrange said video sequence of moving pictures in groups of pictures;
- determine for each frame an estimated amount of bits used to encode the current group of pictures and an estimated instantaneous bit-rate of said bitstream; and
- determine for each frame said respective slopes.

29. The system of claim 24 wherein at least one of these are met:

said zones are in a number of six;
said thresholds of said second set are in a number of five; and
said thresholds of said first set are in a number of four.

30. The system of claim 21 further comprising at least one module to:
- update said at least one reference parameter via an update which is either a positive, negative or a zero integer value, and
- correspondingly update said at least one quantization parameter as a function of said at least one reference parameter.

31. The system of claim 30 wherein said quantization parameter is updated based on relationships:

$$QP_I = Q_{base}$$

$$QP_P = Q_{base} \cdot \alpha$$

$$QP_B = Q_{base} \cdot \alpha$$

wherein:
$Q_{base}$ is said at least one reference parameter;
$\alpha$ and $\beta$ are experimental parameters; and
$QP_I$ with I=I, P and B, are final quantization values for I, P and B frames, respectively.

32. The system of claim 31 wherein said experimental parameters are maintained constant.

33. The system of claim 31 wherein said experimental parameter are adaptively modified on a frame basis.

34. The system of claim 30, further comprising at least one look-up table and wherein said positive, negative or zero update values are selected within said at least one look-up table as a function of entries defined by said zones.

35. The system of claim 34 wherein said plurality of zones defines entries along one of lines or columns of said at least one look-up table, the entries for another of said lines and columns being represented by different ranges of said at least one reference parameter corresponding to different quality levels of said pictures.

36. The system of claim 21 further comprising at least one module to post-process said at least one quantization parameter as a function of at least one of:
- an amount of bits effectively used to encode the last frame;
- a minimum target amount of bits to be used for coding a picture to be encoded; and
- an a priori target for pictures of an I, P or B type.

37. The system of claim 36 wherein said post processing module can vary said variable bit-rate exclusively as a function of an updated variable quantization parameter.

38. The system of claim 21 further comprising a module to adaptively compute thresholds of any of said first, second and third sets of thresholds before encoding said groups of pictures.

39. The system of claim 21 wherein said maximum positive and negative error values are determined as a percentage of said target bit-rate.

40. The system of claim 21 wherein maximum positive and negative error values are determined as a function of a number of frames in the sequence or a frame rate of said sequence.

41. A system to control a bit-rate of a bitstream of encoded video signals, the bitstream being generated from a compressed video sequence of moving pictures, wherein each picture includes a plurality of macroblocks of pixels that are compressed to produce frames, the system comprising:

a means for quantizing said macroblocks as a function of a quantization parameter;
a means for defining a target bit-rate and maximum positive and negative error values between said target bit-rate and an average value of a current bit-rate of said bitstream;
a means for controlling said current bit-rate to constrain it between said maximum positive and negative error values; and
a means for defining at least one reference parameter representative of an average value of said quantization parameter over each picture and updating said at least one reference parameter within an allowed range of variation,
wherein said allowed range is determined as a function of said target bit-rate and said maximum positive and negative error values, wherein the allowed range is determined as a function of at least one of a first set of thresholds determined as a function of said target bit-rate, a second set of thresholds defined as a function of said maximum positive and negative error values, and a third set of thresholds determined experimentally.

42. The system of claim 41 further comprising:
a means for determining for every frame in said sequence a current error value between said target bit-rate and a current bit-rate used in the previous frame, said current error value being constrained between said maximum positive and negative error values;
a means for partitioning a range of said current error value in a plurality of zones; and
a means for determining thresholds of said second set as a function of said plurality of zones.

43. The system of claim 42 wherein said plurality of zones is determined as a function of respective slopes of a curve representative of said current error value, the system further comprising:
a means for arranging said video sequence of moving pictures in groups of pictures;
a means for determining for each frame an estimated amount of bits used to encode a current group of pictures and an estimated instantaneous bit-rate of said bitstream; and
a means for determining for each frame said respective slopes.

44. The system of claim 43, further comprising a means for adaptively computing thresholds of any of said first, second and third sets of thresholds before encoding said groups of pictures.

45. The system of claim 41, further comprising:
a means for updating said at least one reference parameter using an update that is either a positive, negative, or a zero integer value; and
a means for correspondingly updating said at least one quantization parameter as a function of said at least one reference parameter.

46. An article of manufacture, comprising:
a computer-readable medium having stored thereon a computer program, which when executed by a computer processor, cause the processor to control a bit-rate of a bitstream of encoded video signals, the bitstream being generated from a compressed video sequence of moving pictures, wherein each picture includes a plurality of macroblocks of pixels that are compressed to produce frames, by:
quantizing said macroblocks as a function of a ciuantization parameter;
defining a target bit-rate and maximum positive and negative error values between said target bit-rate and an average value of a current bit-rate of said bitstream;
controlling said current bit-rate to constrain it between said maximum positive and negative error values; and
defining at least one reference parameter representative of an average value of said quantization parameter over each picture and updating said at least one reference parameter within an allowed range of variation,
wherein said allowed range is determined as a function of said target bit-rate and said maximum positive and negative error values, wherein said allowed range is determined as a function of at least one of:
a first set of thresholds determined as a function of said target bit-rate;
a second set of thresholds defined as a function of said maximum positive and negative error values; and
a third set of thresholds determined experimentally.

47. The article of manufacture of claim 46 wherein said computer-readable medium having stored thereon the computer program, which when executed by the processor, cause the processor to control the bit-rate of the bitstream of encoded video signals, by further:
updating said at least one reference parameter using an update which is either a positive, negative or a zero integer value; and
correspondingly updating said at least one quantization parameter as a function of said at least one reference parameter, wherein said quantization parameter is updated based on these relationships:

$$QP_I = Q_{base}$$

$$QP_P = Q_{base} \cdot \alpha$$

$$QP_B = Q_{base} \cdot \beta$$

wherein:
$Q_{base}$ is said at least one reference parameter;
$\alpha$ and $\beta$ are experimental parameters; and
$QP_I$ with I=I, P and B, are final quantization values for I, P and B frames, respectively.

48. The article of manufacture of claim 46 wherein said thresholds of said first, second, and third sets are determined as a function of parameters maintained constant over a whole of said video sequence.

49. The article of manufacture of claim 46 wherein said thresholds of said first, second and third sets are determined as a function of parameters that are adaptively changed over the video sequence.

50. A method to control a bit-rate of a bitstream of encoded video signals, the bitstream being generated from a compressed video sequence of moving pictures, wherein each picture includes a plurality of macroblocks of pixels that are compressed to produce frames, the method comprising:
quantizing said macroblocks as a function of a quantization parameter;
defining a target bit-rate and maximum positive and negative error values between said target bit-rate and an average value of a current bit-rate of said bitstream;
controlling said current bit-rate to constrain it between said maximum positive and negative error values; and
defining at least one reference parameter representative of an average value of said quantization parameter over each picture and updating said at least one reference parameter within an allowed range of variation, wherein said allowed range is determined as a function of said target bit-rate and said maximum positive and negative error values.

51. The method of claim 50 wherein said maximum positive and negative error values are determined as a percentage of said target bit-rate.

52. The method of claim 50 wherein said maximum positive and negative error values are determined as a function of a number of frames in the sequence or a frame rate of said sequence.

53. An apparatus to control a bit-rate of a bitstream of encoded video signals, the bitstream being generated from a compressed video sequence of moving pictures, wherein each picture includes a plurality of macroblocks of pixels that are compressed to produce frames, said macroblocks being quantized as a function of a quantization parameter, the apparatus comprising:

a first module to define a target bit-rate and maximum positive and negative error values between said target bit-rate and an average value of a current bit-rate of said bitstream;

a second module coupled to the first module to control said current bit-rate to constrain it between said maximum positive and negative error values; and a third module to define at least one reference parameter representative of an average value of said quantization parameter over each picture and to update said at least one reference parameter within an allowed range of variation, wherein said allowed range is determined as a function of said target bit-rate and said maximum positive and negative error values.

54. The apparatus of claim 53 wherein said maximum positive and negative error values are determined as a percentage of said target bit-rate.

55. The apparatus of claim 53 wherein said maximum positive and negative error values are determined as a function of a number of frames in the sequence or a frame rate of said sequence.

* * * * *

UNITED STATES PATENT AND TRADEMARK OFFICE
CERTIFICATE OF CORRECTION

PATENT NO. : 7,349,474 B2  Page 1 of 1
APPLICATION NO. : 10/459104
DATED : March 25, 2008
INVENTOR(S) : Daniele Bagni et al.

It is certified that error appears in the above-identified patent and that said Letters Patent is hereby corrected as shown below:

Title Page
Item (75), "Genoa" should read as -- Genova --

Column 19
Line 47, "respective slope of curve" should read as -- respective slope of curve --

Column 20
Line 20, "$QP_B = Q_{base}^{\alpha}$" should read as -- $QP_B = Q_{base}^{\beta}$ --
Line 29, "parameter are adaptively modified" should read as -- parameters are adaptively modified --

Column 21
Line 66, "ciuantization" should read as -- quantization --

Signed and Sealed this

Fifteenth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,349,474 B2
APPLICATION NO. : 10/459104
DATED : March 25, 2008
INVENTOR(S) : Daniele Bagni et al.

It is certified that error appears in the above-identified patent and that said Letters Patent is hereby corrected as shown below:

Column 19
Line 47, "respective slope of curve" should read as -- respective slopes of a curve --

Signed and Sealed this

Second Day of September, 2008

JON W. DUDAS
*Director of the United States Patent and Trademark Office*